Feb. 6, 1968   R. R. COCKLE ET AL   3,367,496
GRAIN SAVING DEVICE FOR COMBINES
Filed June 14, 1965   2 Sheets-Sheet 1
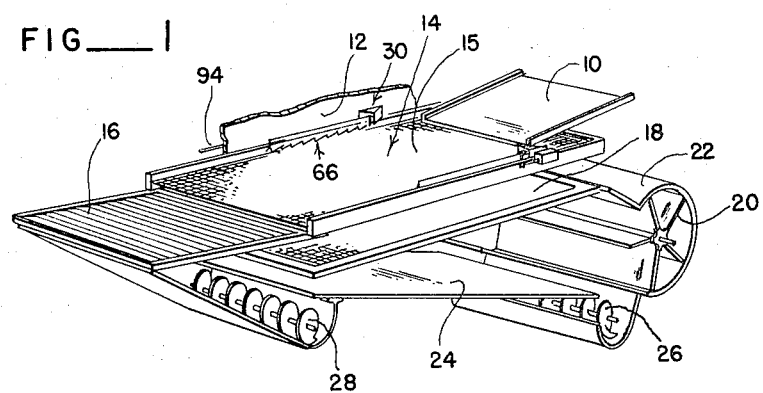
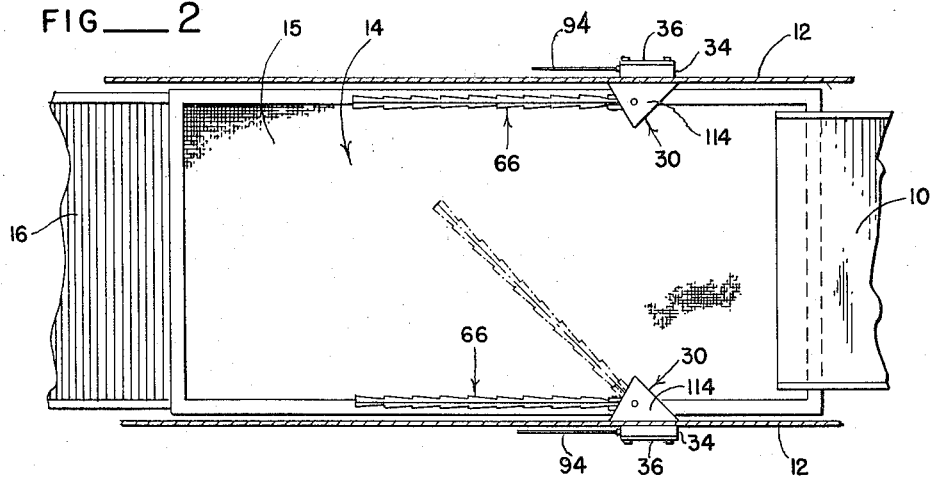
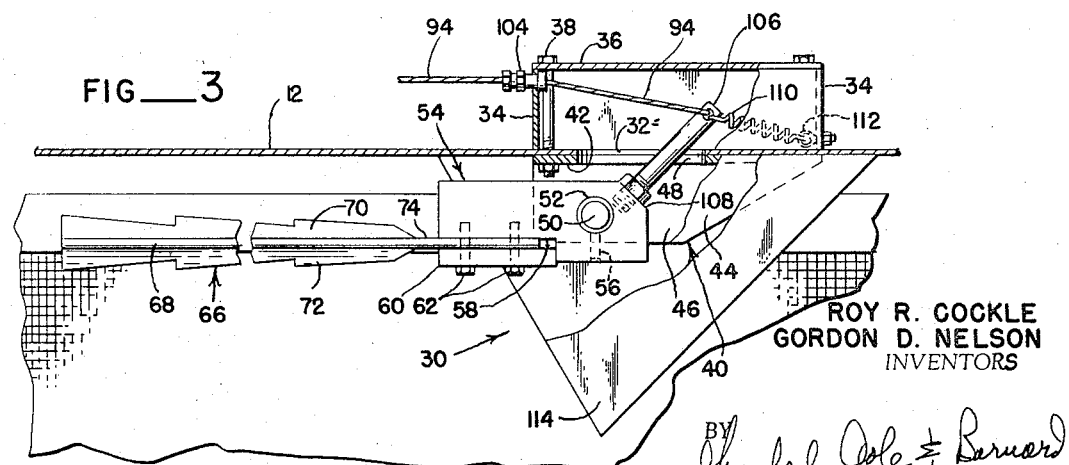
ROY R. COCKLE
GORDON D. NELSON
INVENTORS
BY Graybeal, Cole & Barnard
ATTORNEYS Feb. 6, 1968   R. R. COCKLE ET AL   3,367,496
GRAIN SAVING DEVICE FOR COMBINES
Filed June 14, 1965   2 Sheets-Sheet 2
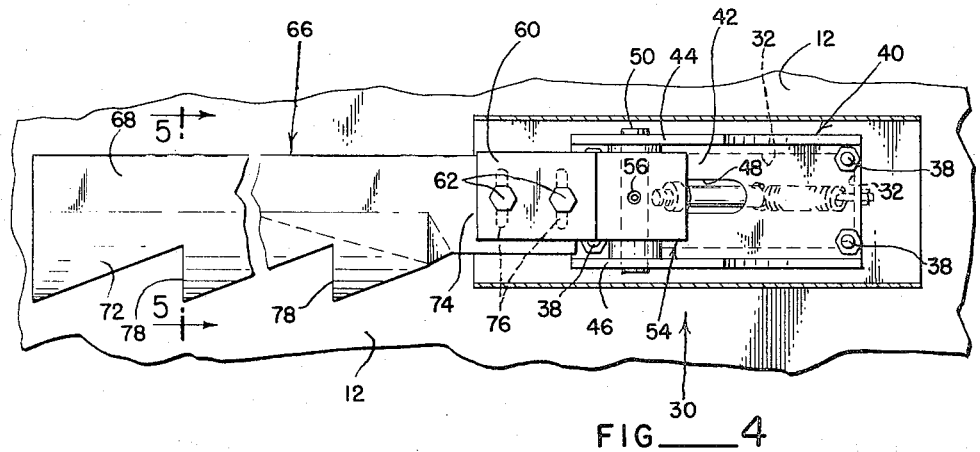
FIG__4
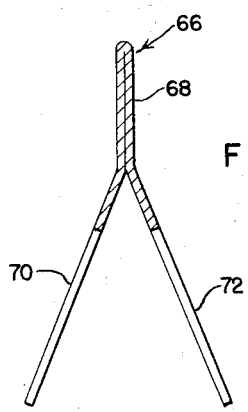
FIG__5
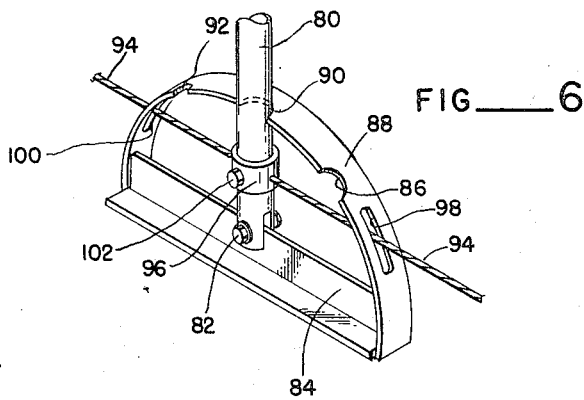
FIG__6
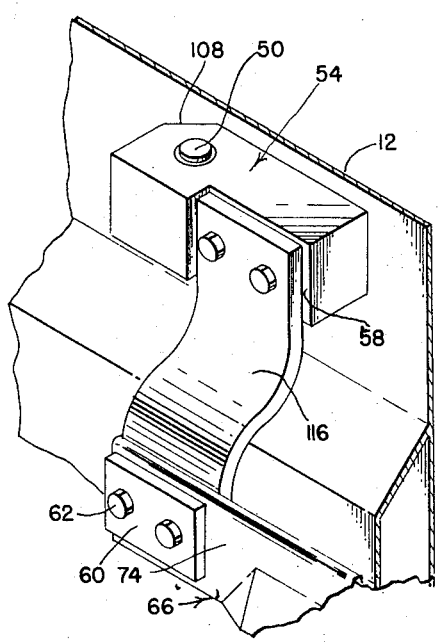
FIG__7
ROY R. COCKLE
GORDON D. NELSON
INVENTORS
BY *Kroybeal, Cole & Barnard*
ATTORNEYS United States Patent Office 3,367,496
Patented Feb. 6, 1968

3,367,496
GRAIN SAVING DEVICE FOR COMBINES
Roy R. Cockle, Box 65, Oroville, Wash. 98844, and
Gordon D. Nelson, Box 75, Redondo, Wash. 98054
Filed June 14, 1965, Ser. No. 463,598
5 Claims. (Cl. 209—261)

This invention relates to an improvement in attachments for a grain harvester, and more particularly does this invention relate to a means for distributing grain and chaff mixture over the chaffer screen in a harvester when the machine is operating on hillsides and non-level terrain.

In operating a grain harvester on hillsides, there is a substantial loss of grain because the grain and chaff mixture move to the downhill side of the machine and build up to such a depth that the separation or cleaning function of the combine is impaired. A conventional combine, as those skilled in the art are aware, has no equipment or attachments for maintaining the grain and chaff mixture evenly over the surface of the chaffer screen or grain cleaning shoe while the machine is operating on non-level terrain. On a hillside the grain and chaff tends to build up along the lower edge of the shoe. The mixture will build up or bank to such a depth that the wind beneath the shoe is unable to penetrate the mixture and thereby separate them. As a result, the grain and chaff mixture will proceed rearwardly and fall over the edge of the shoe to be dumped off the rear end of the combine. There are hillside harvesters available which are self-leveling on slopes. However, the cost to the average rancher is prohibitive in that the cost of the self-leveling hillside harvesters is approximately double the price of a level land machine. The great majority of machines sold are of course the level land type which suffers the lost grain problem. Efforts have been made to devise attachments which would effectively prevent the grain and chaff mixture from accumulating on one side or the other of the chaffer screen, but by and large such efforts have been ineffectual.

The present invention overcomes the deficiencies of hitherto known devices by providing controlled pivotal blades on the inside wall surfaces of the combine housing in such a way that a blade may be swung or pivoted outwardly from either side over the shoe or chaffer screen as needed. The blade of each grain saver swings out over the shoe at a predetermined height so that as the vibration of the pan and shoe moves the grain and chaff mixture rearwardly, the blade only allows the mixture to pass beneath it at a desirable depth. As the grain and chaff mixture moves along a side of the machine, it encounters the blade and is deflected across the screen and passes beneath the blade at a depth which will allow the wind to force effective separation of the chaff. The blades of this invention do not attach to the chaffer screen or shoe, but are rather adjustably and detachably secured to the walls of the combine itself. Actuation of the blade on either side of the shoe is achieved by a simple control handle near the combine operator's seat which is connected to the blades by small diameter cable running over a series of pulleys to the actuating mechanism for the blades.

Accordingly, it is a feature of this invention to provide a grain saving device which is simple in design, rugged in construction, and economical to manufacture.

Another feature of this invention is to supply a grain saving apparatus which is readily adaptable to all known types of combines.

Still another feature of this invention is to supply a grain saving apparatus which prevents grain from building up or banking on one side of the chaffer screen so that the chaff cannot be separated therefrom.

Yet another feature of this invention is to furnish a grain saving apparatus which is easily controllable from the combine operator's seat.

A further feature of this invention is to provide a grain saving apparatus which can be installed with very little trouble and time on new and old combines.

A still further feature of this invention is to furnish a grain saving apparatus in which the depth of the grain and chaff mixture moving over the chaffer screen and beneath the blade is adjustable.

An even further feature of this invention is to provide a grain saving apparatus in which the parts for either side, including blades and actuating mechanism, are interchangeable.

These and other features and advantages reside in the details of construction and operation as more fully hereinafter described and claimed. Reference will be had to the accompanying drawings, wherein like numerals refer to like parts throughout, and in which:

FIGURE 1 is a partial view in perspective showing the grain pan and chaffer screen and wind fan section of a combine;

FIGURE 2 is a top plan view showing the relative position of the grain saver assemblies on each side of the chaffer screen;

FIGURE 3 is a top plan view showing the details of construction of the mounting and actuating mechanism for the blades;

FIGURE 4 is a side elevational view showing further details of the blade actuating assembly;

FIGURE 5 is a cross-sectional view of the blade taken along line 5—5 of FIGURE 4;

FIGURE 6 is an illustrative perspective view of the control handle mounting assembly for actuating the grain saver blades; and FIGURE 7 is a partial perspective view showing an adapter bracket which would be required in some makes of combines.

Referring now to the drawings, and particularly to FIGURE 1, it will be seen that only that portion of the combine with which the grain saver apparatus is concerned has been shown. As those skilled in the art know, chaff separation is accomplished by directing the grain and chaff mixture from the threshing cylinder (not shown) onto the shoe 14 by way of the grain pan 10. A side wall 12 of the combine housing is shown to illustrate the relationship of the grain saver assemblies with respect to the combine housing. As can be seen, chaffer screen 15 is a rectangular mesh or sieve structure with the grain pan 10 leading onto the forward end and a return cleaner 16 located at the rear end of chaffer screen 14. The entire structure comprised of the grain pan 10, chaffer screen 14 and return cleaner 16 is mounted on an eccentric for rapid vibratory or oscillatory motion. Shoe 14 is usually mounted on an eccentric mechanism so that the grain moves from front to rear down the inclined grain pan over the chaffer screen with the tailings going out of the combine over the back end of return cleaner 16. A secondary chaffer screen 18 is located under chaffer screen 15 and is normally parallel thereto, and also, vibrated with the rest of the assembly 14. A wind fan 20 in the fan housing 22 delivers a stream of air upwardly through the secondary and primary chaffer screens to lift the chaff away from the grain. The clean grain falls through the chaffer screens 15 and 18 and is directed on inclined wall 24 to a clean grain auger 26 which conveys the clean grain to a hopper or other receptacle. Heads from which the grain has not been threshed reach the return cleaner 16, drop through the return cleaner and fall into a tailings auger 28 which redirects the unseparated heads back to the threshing cylinder to repeat the cycle. Straw and other material from which the grain has been separated, proceeds out over the rear end of the return cleaner 16 and is dropped onto the ground. As long as the conventional machine is on level ground, the grain and chaff mixture will proceed over the chaffer screen fairly uniformly distributed so that the wind performs its separating function very effectively and efficiently. When the machine is tilted on a hillside, however, the tendency is for the grain and chaff mixture to build up or bank along the lower edge of the chaffer screen, thereby defeating the separation function.

Secured to the combine housing wall 12 on each side and above the shoe are the grain saver attachments generally designated by the number 30, the details of which are best seen in FIGURES 3 and 4. A rectangular hole or opening 30 is cut in the combine wall 12 to permit mounting of the grain saver attachments to the machine. The rectangular opening 30 is enclosed on the outside of the wall by a box or enclosure means 34 with a lid or closure member 36. Box 34 and closure member 36 are attached to the inner surface of combine wall 12 by bolts 38 extending through the box interior through said wall 12 and attached on the inside of the wall as follows. A channel-shaped mounting member, generally designated by the number 40, has a generally vertically disposed web or base 42 and generally horizontally disposed upper flange 44 and lower flange 46. Bolts 38 in extending from the outside of box and closure member 34 and 36 and in passing through wall 12, also pass through the web or base wall 42 of mounting member 40. Mounting member 40 has an elongate slot 48 in web 42 generally centered between the flanges. Extending through the mounting member 40 in spaced relation to the edges and web 42 is a generally vertically positioned mounting pin or shaft 50. Appropriate bearing holes are cut in the flanges 44 and 46 with bearing means 52 therein provided for minimizing friction.

A blade mounting block generally designated by the number 54, is reecived between the flanges 44 and 46 of the mounting member 40. Mounting block 54 is generally rectangular in shape. As can be seen, blade mounting block 54 has a passage cut or formed vertically therethrough in order to receive pin 50. A lock screw 56 enters from one side to secure the pin 50 and blade mounting block 54 together. It will be seen that approximately half of the block 54 extends rearwardly and away from mounting member 40 in such a way that it is free to pivot on pin 50 through an angle of approximately 40 to 60 degrees. The rear portion of the block on the inside face has an inwardly offset blade surface 58 to accommodate the blade to be more fully described hereinafter. A clamping plate 60 and clamping bolts 62 are provided to hold the blades securely on the mounting block.

The blade, generally designated by the number 66, is a light sheet metal affair, which may be constructed in a number of different ways. It has been found, however, that the top portion of the blade may be a double thickness, as at 68, in order to form a spine for strength and rigidity. Below the top portion or spine 68 the doubled over sections of the blade flare outwardly or divergently to form a double blade composed of sections 70 and 72. The front or mounting end of the blade is a flat portion 74 having generally vertically disposed slots 76 to receive clamping bolts 62. The slots allow for adjustment of the blade to its desired height above the shoe. The flared or separate diverging sections of the blade starting immediately rearwardly of the mounting section 74, continue outwardly to the very end of the blade. The blade, as can be seen, has teeth 78 in both blade sections 70 and 72. Actuation of the blade is accomplished from the operator's cab or seat by interconnecting the grain saving devices with the operator's position by means of a cable. A cable actuating lever or handle 80 is pivotally connected as at 82, to a lever support means or bracket 84. A semi-circular lever positioning or guide member 86 extends from end to end of bracket 84, and is provided with indentations or notches 88, 90, and 92 to assist in holding the actuating lever in the particular position desired. It will be understood that the lever assembly shown is merely illustrative, since many alternative structures for actuating the grain saver assemblies will occur to those skilled in the art. The cable 94 is attached to collar or ring 96 located on actuating lever 80. The handle positioning or guide member 86 is provided with cable slots 98 and 100, in the manner shown. Collar or ring 96 may be adjusted upwardly or downwardly on handle 80 by virtue of locking screw or device 102, so that the distance the cable is moved may be adjusted. Cable 94 passes from the operating station, over the body and housing of the combine, through a series of pulleys (not shown) and down the side of the combine so that it may be led into and attached to the grain saver assemblies and actuating mechanism from the rear in the manner shown. FIGURE 3 shows cable 94 brought into the interior of box 34 through a cable fitting 104. Extending generally outwardly and forwardly from the forward outer corner of mounting block 54 is actuating arm 106. Preferably the front outside corner of mounting block 54 is bevelled off as at 108 at the angle desired to extend actuating arm 106 through slots 48 and 32 into the interior of box 34. It will be seen that actuating arm 107 has attached thereto tension spring 110 and that the other end of tension spring 110 is connected to appropriate securing means 112 on the forward interior end of box 34. The tensile strength of tension spring 110 is enough to normally bias blade 66 into the position shown in FIGURE 3, that is, generally parallel to housing wall 12. Cable 94, by means of lever 80, overcomes the tensile strength of spring 110 and swings arm 106 rearwardly around pivot pin 50. In this way, mounting block 54 and the blade are swung outwardly over the chaffer screen, as suggested by dash-dot lines in FIGURE 2. A light sheet meal housing 114 encloses the actuating mechanism both below and above and in front, so that grain, as it moves from the pan is deflected by housing 114 away from the actuating mechanism. FIGURE 7 shows an adapter bracket 116 for interconnecting mounting block 54 with blade 66 when the inside wall structure of a particular make of combine dictates that direct connection of the blade to the block is not feasible.

It will be appreciated that modifications and changes will occur to those skilled in the art, and that the preferred embodiment shown is merely illustrative of the principles of this invention. Hence it is not desired to limit the invention to the exact construction shown and described. Accordingly, all suitable modifications and equivalents may be resorted to which fall within the scope of the invention.

What is claimed is:

1. A grain saving apparatus for attachment to grain harvesters and in close proximity to the chaffer screen thereof, comprising: (a) a mounting member secured to the inner surface of the housing wall of said harvester and having a generally vertically disposed mounting pin rotatably supported thereon; (b) a blade mounting means received on and detachably secured to said pin for pivotal movement with said pin; (c) an actuating arm connected by one end to said blade mounting means and extending through an opening in said housing wall and thereby protruding outside said housing wall; (d) an elongated blade means detachably and vertically adjustably secured by one end to said blade mounting means, said blade means being normally biased to a position generally parallel to said housing wall by a resilient spring means interconnected between the other end of said actuating arm and connector means on said housing wall; and (e) cable means also attached to the other end of said actuating arm, said cable means adapted to be controlled from the operator's position of said combine to overcome the force of said spring to thereby pivot said blade and blade mounting means inwardly away from said housing wall and over said chaffer screen.

2. A grain saving apparatus for attachment to grain harvesters and in close proximity to the chaffer screen thereof, comprising: (a) a mounting member secured to the inner surface of the housing wall of said harvester and having a generally vertically disposed mounting pin rotatably supported therein; (b) a blade mounting means received on and detachably secured to said pin for pivotal movement with said pin, said blade mounting means having a forward portion and a rear portion; (c) an actuating arm connected generally to the front portion of said blade mounting means and extending through an opening in said housing wall and thereby protruding outside said housing wall; (d) an elongated blade means detachably and vertically adjustably secured generally to the rear portion of said blade mounting means, said blade means being normally biased to a position generally parallel to said housing wall by a resilient spring means interconnected between said actuating arm and connector means on the outside of said housing wall; and (e) cable means also attached to the other end of said actuating arm, said cable means adapted to be controlled from the operator's position of said combine to overcome the force of said spring to thereby pivot said blade and blade mounting means inwardly away from said housing wall and over said chaffer screen at a predetermined distance thereabove.

3. A grain saving apparatus for attachment to grain harvesters and in close proximity to the chaffer screen thereof, comprising: (a) a mounting member secured to the inner surface of the housing wall of said harvester and having a generally vertically disposed pivot means rotatably supported therein; (b) a blade mounting means received on and detachably secured to said pivot means for pivotal movement with said pivot means, said pivot being spaced from said housing to allow said blade mounting means to pivot through a predetermined arc; (c) an actuating arm connected by one end to said blade mounting means and extending through an opening in said housing wall and thereby protruding outside said housing wall; (d) a rearwardly extending elongated blade means detachably and vertically adjustably secured to said blade mounting means, said blade means being normally biased to a position generally parallel to said housing wall by a resilient spring means interconnected between said actuating arm and connector means on said housing wall; and (e) cable means also attached to said actuating arm, said cable means adapted to be controlled from the operator's position of said combine to overcome the force of said spring to thereby pivot said blade and blade mounting means inwardly away from said housing wall and over said chaffer screen at a predetermined distance thereabove.

4. A grain saving apparatus for attachment to grain harvesters and for cooperation action with the chaffer screen thereof, comprising: (a) a mounting member secured to the inner surface of the housing wall of said harvester and having generally vertically disposed pivot means rotatably supported thereon; (b) blade mounting means having rear and forward portions received on and detachably secured to said pivot means for pivotal movement therewith; (c) an actuating arm connected generally to the forward portion of said blade mounting means and extending through an opening in said housing wall and thereby protruding outside said housing wall; (d) an elongate blade means detachably and vertically adjustably secured generally to the rear portion of said blade mounting means, said blade means being normally biased to a position generally parallel to said housing wall by resilient spring means interconnected between said actuating arm and connector means on said housing wall; and (e) cable means also attached to the other end of said actuating arm, said cable means adapted to be controlled from the operator's position of said combine to overcome the force of said spring to thereby pivot said blade and blade mounting means inwardly away from said housing wall and over said chaffer screen at a predetermined distance thereabove.

5. A grain saving apparatus for attachment to grain harvesters and for cooperation action with the chaffer screen thereof, comprising: (a) a mounting member secured to the inner surface of the housing wall of said harvester and having a generally vertically disposed pivot means rotatably supported therein; (b) blade mounting means received on and detachably secured thereto for pivotal movement with said pivot means; (c) an actuating arm connected to said blade mounting means and extending through an opening in said housing wall and thereby protruding outside said housing wall; (d) an elongate blade means detachably and vertically adjustably secured to said blade mounting means and extending rearwardly therefrom, said blade means being normally biased to a position generally parallel to said housing wall by a resilient spring means interconnected between said actuating arm and spring connector means on said housing wall; and (e) cable means also attached to the other end of said actuating arm, said cable means adapted to be controlled from the operator's position of said combine to overcome the force of said spring to thereby pivot said blade and blade mounting means inwardly and forwardly away from said housing wall and over said chaffer screen at a predetermined distance thereabove.

References Cited

UNITED STATES PATENTS

| | | | |
|---|---|---|---|
| 2,732,941 | 1/1956 | Deiss | 209—261 |
| 3,061,096 | 10/1962 | Wyer | 209—26 |
| 3,108,064 | 10/1963 | Grant | 209—261 X |

ANTONIO F. GUIDA, *Primary Examiner.*

ABRAHAM G. STONE, *Examiner.*